(12) United States Patent
Iida et al.

(10) Patent No.: US 12,556,637 B2
(45) Date of Patent: Feb. 17, 2026

(54) SYSTEM FOR ESTABLISHING COMMUNICATION

(71) Applicant: SYSTEM DESIGN CORPORATION., Fukui (JP)

(72) Inventors: Mitsuhiro Iida, Fukui (JP); Shigeo Fukugi, Fukui (JP)

(73) Assignee: SYSTEM DESIGN CORPORATION, Fukui (JP)

( * ) Notice: Subject to any disclaimer, the term of this patent is extended or adjusted under 35 U.S.C. 154(b) by 371 days.

(21) Appl. No.: 18/277,979

(22) PCT Filed: Oct. 19, 2022

(86) PCT No.: PCT/JP2022/038986
§ 371 (c)(1),
(2) Date: Aug. 18, 2023

(87) PCT Pub. No.: WO2024/084633
PCT Pub. Date: Apr. 25, 2024

(65) Prior Publication Data
US 2025/0023987 A1    Jan. 16, 2025

(51) Int. Cl.
*H04M 3/56*    (2006.01)
(52) U.S. Cl.
CPC .................. *H04M 3/56* (2013.01)
(58) Field of Classification Search
CPC ....................................................... H04M 3/56
See application file for complete search history.

(56) References Cited

U.S. PATENT DOCUMENTS

2002/0078150 A1* 6/2002 Thompson ............ H04L 67/306
709/227
2002/0099795 A1* 7/2002 Betros ................... H04L 69/329
709/219

(Continued)

FOREIGN PATENT DOCUMENTS

JP    2011-188358 A    9/2011
JP    2017-76974 A     4/2017

(Continued)

*Primary Examiner* — Brenda H Pham
(74) *Attorney, Agent, or Firm* — H&I PARTNERS; Chai Im; C. Andrew Im

(57) ABSTRACT

A system to establish communication that reduces the time to establish inter-terminal communication and reduces load on the server during establishment of communication between host terminal and client terminal, during inter-terminal communication after establishment of communication and during reconnection. A system to establish communication includes a host terminal, at least one client terminal, and a server that mediates their communication. The host terminal includes host-side communication requester to send host terminal information to the server and host-side manager to manage client terminal information of individual client terminals. The client terminal includes client-side communication requester to send client terminal information to the host terminal and client-side manager to manage host terminal information. The system is configured so that, after the host terminal makes a direct session start request to the client terminal based on the client terminal information, communication is established between the host terminal and the client terminal.

7 Claims, 3 Drawing Sheets

(56) References Cited

U.S. PATENT DOCUMENTS

2015/0113110 A1   4/2015  Shimakawa
2018/0302370 A1   10/2018 Nakahara et al.
2022/0029842 A1   1/2022  Onoue et al.

FOREIGN PATENT DOCUMENTS

JP   2018-160874 A   10/2018
JP   2020-129207 A   8/2020
WO   2013/145522 A1   10/2013

* cited by examiner

SYSTEM FOR ESTABLISHING COMMUNICATION

RELATED APPLICATION

This application is a § 371 application of PCT/JP2022/038986 filed Oct. 19, 2022, which is incorporated herein by reference in its entirety.

TECHNICAL FIELD

The present invention relates to a system for establishing communication between a host terminal and at least one client terminal, particularly to a system that can quickly establish inter-terminal communication, reduce load on server during processing for establishing communication between host terminal and client terminal, and maintain communication even during server outage or other failure.

BACKGROUND OF THE INVENTION

Many variously enhanced systems for establishing communication have been devised and put to use and various systems for ensuring communication stability and security have been developed and utilized. Particularly in the case of communication systems used in networks such as the Internet, reconnection becomes necessary when, for example, an unintended disconnection or similar occurs, and technologies that can rapidly respond to this need, and similar technologies, are available.

A technology related to a system for establishing communication is found in Japanese Patent Publication No. 2020-129207A. As a technology directed to stably implementing a minimal-delay chat environment, this publication discloses a technology whereby, when a client terminal sends a chat room opening request, the gateway acquires the client terminal's location, the relay point allocation server selects a chat server or area thereof appropriate from the viewpoint of area and communication speed, opens a chat room, and the chat server relays chat data between the client terminals.

Since this technology adopts a configuration selectively utilizing multiple servers, it should indeed be capable of building a minimal-delay, stable network environment. However, owing to its need to always perform two-way communication through a server, it has a drawback in the point of placing a load on the server. It is especially problematic in the point that when reconnection becomes necessary during communication, the server load increases owing to the need for server intervention to establish communication. Another shortcoming is that overall system cost is increased by the need to build multiple servers.

Further, a technology related to a system for restoring communication upon malfunction of optical communication equipment is found in Japanese Patent Publication No. 2018-160874A. This publication discloses a configuration in which a restoration apparatus is connected to a control plain local network of a node and obtains address information on nodes in a subnet including the node present in the control plane local network from an emergency connection server, the restoration apparatus checks whether the node in the subnet can be connected to another node in the subnet, by using the address information on the nodes, and notifies the emergency connection server of information on a node in the subnet to which the node can be connected, and the emergency connection server performs emergency restoration of the control plane in the control plane local network.

This technology should certainly be able to easily restore an optical communication network that sustained a malfunction. However, it has an inherent disadvantage in that the network restoration procedure is complicated and the restoration is time consuming.

In communicating between terminals, the ordinary configuration that constantly connects to the server places a load on the server and also leads to increased network traffic. Development has therefore been desired of a system for establishing communication that can minimize server load during establishment of inter-terminal processing and during communication.

PRIOR ART DOCUMENTS

Patent Documents

Patent Document 1: Japanese Patent Publication No. 2020-129207A
Patent Document 2: Japanese Patent Publication No. 2018-160874A

OBJECT AND SUMMARY OF THE INVENTION

Problem to be Overcome by the Invention

In order to solve the aforesaid problems, the present invention is directed to a system for establishing communication between a host terminal and at least one client terminal, particularly to a system for establishing communication that can quickly establish inter-terminal communication, can reduce load on the server during processing for establishing communication between the host terminal and a client terminal, during inter-terminal communication after establishment of communication and during reconnection processing, and can maintain communication even during server outage or other failure.

Means for Solving the Problem

In order to achieve the aforesaid object, the system for establishing communication according to the present invention is a communication establishing system for establishing two-way communication via the Internet between a host terminal and at least one client terminal, comprising a host terminal that sends a communication start request, at least one client terminal that accepts the communication start request, and a server that mediates establishment of communication between the host terminal and the client terminal, wherein the host terminal comprises host side communication request means for sending host terminal information to the server and host side management means for managing client terminal information of individual client terminals and the client terminal comprises client side communication request means for sending client terminal information to the host terminal and client side management means for managing host terminal information, which system for establishing communication comprises connection means for, after the host terminal makes a direct session start request to the client terminal based on the client terminal information received from the client terminal, establishing communication between the host terminal and the client terminal.

In another aspect of the configuration, in order to enable the connection means to shorten time to communication establishment and to reduce server load at time of change of the host terminal information used for establishing host terminal communication, by having the host terminal send the changed host terminal information to the client terminal via the server, the host side communication request means extracts client terminal requesting communication from the client side management means, designates the same, and sends host terminal information to the server, and the server, after identifying the client terminal designated by the host side communication request means, sends the host terminal information to the client terminal concerned and notifies it to request communication establishment with the host terminal, the client side communication request means being adapted to, based on the received host terminal information, send client terminal information to the designated host terminal extracted from the client side management means (220) and request the host terminal to establish communication, and the connection means further comprising client terminal authentication means for use by the host terminal to authenticate the client terminal.

In another aspect of the configuration, the client terminal authentication means is adapted to perform authentication by the client terminal using a random key generated by the host terminal to encrypt and send to the host terminal a terminal unique ID and the host terminal decrypting the encrypted terminal unique ID.

In another aspect of the configuration, the host terminal comprises host side communication disconnect detection means and the host side communication request means responds to detection of communication disconnection by the host side communication disconnect detection means by extracting the client terminal requesting communication from the client side management means, designating the same, and sending host terminal information to the server, thereby reestablishing communication with the designated client terminal.

In another aspect of the configuration, the client terminal comprises client side communication disconnect detection means and the client side communication request means responds to detection of communication disconnection by the client side communication disconnect detection means by sending, based on the host terminal information, client terminal information to the designated host terminal extracted from the client side management means and requests the host terminal to establish communication, thereby reestablishing communication with the designated host terminal.

In another aspect of the configuration, the host terminal information includes IP address and port number of the host terminal and the client terminal information includes IP address and port number of the client terminal.

EFFECTS OF THE INVENTION

Since the present invention is configured as described in detail in the foregoing, it has the following effects:

1. As server intervention during communication establishment is minimized, load on server can be reduced during processing for establishing communication between host terminal and client terminal, and during communication between terminals. Moreover, time for establishing communication between host terminal and client terminal can be reduced.
2. As a configuration is adopted wherein host side communication request means sends terminal information to client terminal via server and client side communication request means requests host terminal to establish communication, server intervention can be minimized and inter-terminal communication can be continued even during server outage. In addition, even in a case where IP address or other host terminal information used to establish host terminal communication is changed, communication can be reestablished by host terminal sending the changed host terminal information to client terminal via server, thereby reducing server load. Moreover, reestablishment of communication can be requested directly to host terminal from client terminal side without server intervention.
3. As a configuration is adopted wherein client terminal authentication means encrypts a terminal unique ID using a random key, thus enabling communication encryption and making possible provision of a highly reliable system for establishing communication.
4. As a configuration is adopted wherein host terminal comprises host side communication disconnect detection means, prompt detection of communication disconnection and transition to reconnection processing becomes possible.
5. As a configuration is adopted wherein client terminal comprises client side communication disconnect detection means, prompt detection of communication disconnection and reconnection processing request directly to host terminal becomes possible.
6. As a configuration is adopted wherein host terminal information and client terminal information include IP address and port number, terminal of other communicating party can be directly identified.

DETAILED DESCRIPTION OF THE EMBODIMENTS

Figure 1:
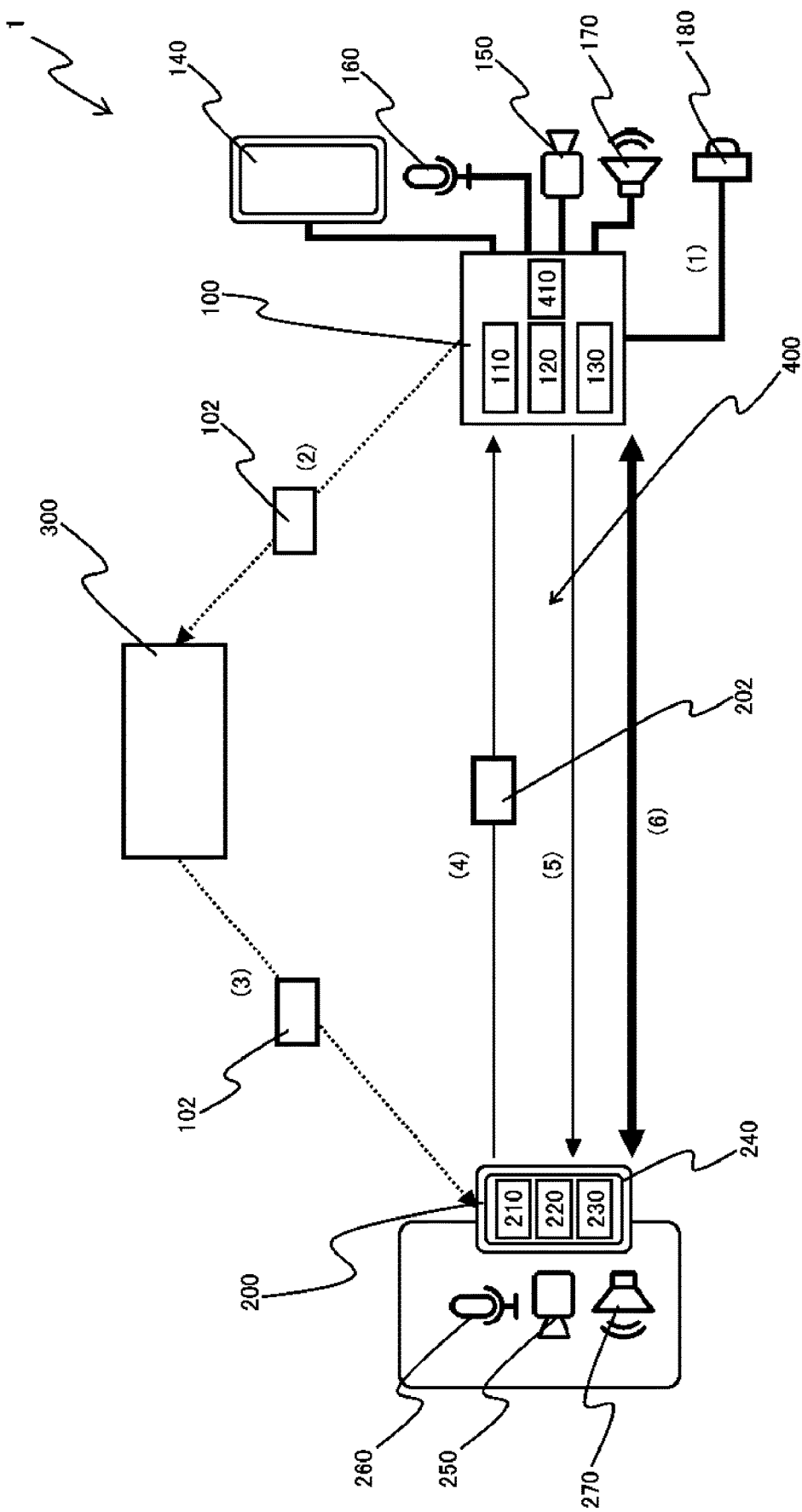
FIG. 1. is a conceptual diagram of a system for establishing communication according to the present invention.
Figure 2:
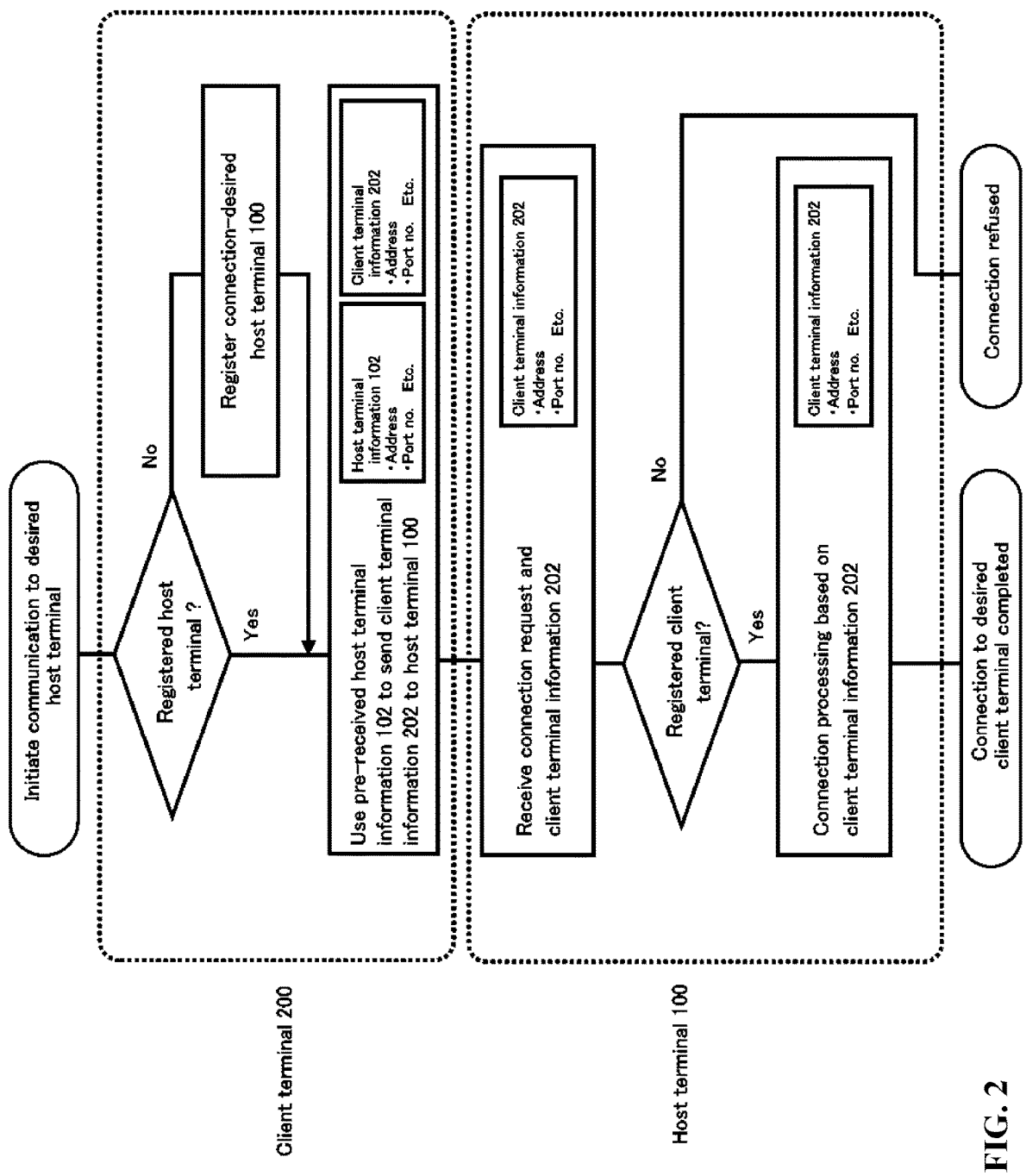
FIG. 2. is a diagram showing connection flow from client side.
Figure 3:
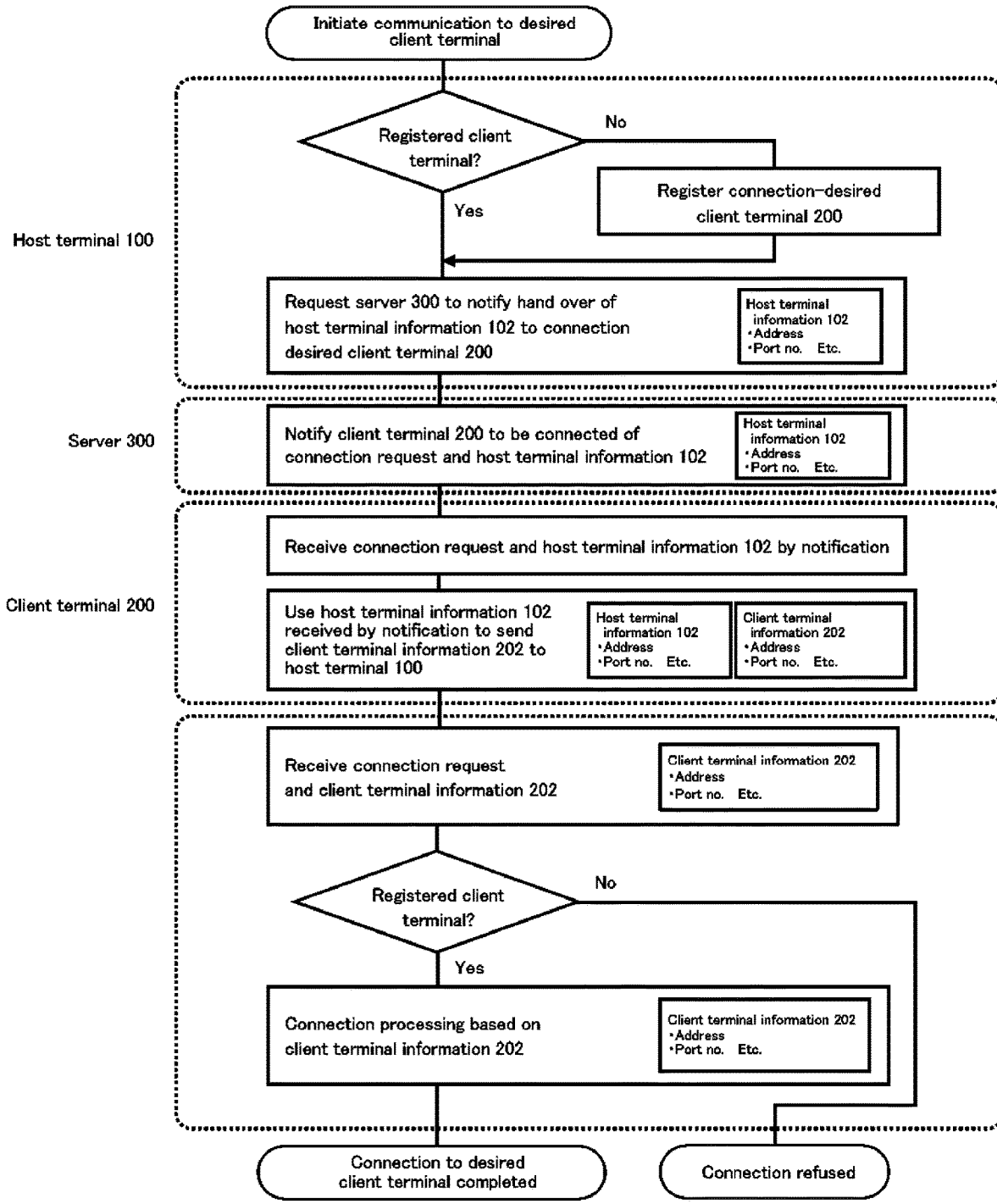
FIG. 3. is a diagram showing connection flow of the system for establishing communication.

There now follows a detailed explanation of the system for establishing communication according to the present invention, based on an embodiment shown in the drawings. FIG. 1 is a conceptual diagram of a system for establishing communication according to the present invention. FIG. 2 is a diagram showing connection flow from client side. FIG. 3 is a diagram showing connection flow of the system for establishing communication.

As shown in FIG. 1, the system for establishing communication 1 of the present invention comprises a host terminal 100, at least one client terminal 200 and a server 300. By establishing server 300 mediated two-way communication between the host terminal 100 and the client terminal 200 via the Internet, the system for establishing communication shortens time to communication establishment, reduces server load, and ensures communication stability and security.

As shown in FIG. 1, in the present embodiment, the system for establishing communication 1 according to the present invention is configured for mutual audio-video or the like communication between the host terminal 100 and the client terminal 200. The host terminal 100 and the client terminal 200 have respective video display means 140/240, imaging means 150/250, microphones 160/260 and speakers 170/270 but are not limited to this configuration and may instead be configured solely for audio communication or for back-and-forth exchange of character or image information. Moreover, the present embodiment adopts a configuration in which the host terminal 100 is a dedicated computer and the client terminal 200 is one or more smartphones or other tablet-like computers but the present invention is not limited to this configuration.

In the present embodiment, the host terminal 100 is equipped with communication initiation means 180 for initiating communication, namely, as shown in FIG. 1, is equipped with a communication start button as the communication initiation means 180 but is not limited to this arrangement and communication initiation can instead be implemented by processing performed by software installed in the host terminal 100.

There now follows a detailed explanation of the individual elements constituting the system for establishing communication 1 according to the present invention. The host terminal 100 is a terminal that requests start of communication in the system for establishing communication 1. As shown in FIG. 1, it is equipped with host side communication request means 110 and host side management means 120. The host side communication request means 110 is means for sending host terminal information 102 to the server 300. Here, the host terminal information 102 is information for enabling identification of and communication with the host terminal 100 from the outside.

The host side management means 120 is means for managing client terminal information 202 of each of one or more client terminals 200. As this results in the host terminal 100 itself managing information related to the client terminals 200, the server and the like are freed from centralized management and load on the server can therefore be reduced.

The client terminal 200 is a terminal that accepts a communication start request from the host terminal 100 and, as shown in FIG. 1, is equipped with client side communication request means 210 and client side management means 220. The client side communication request means 210 is means for sending client terminal information 202 to the host terminal 100. Here, the client terminal information 202 is information for enabling the host terminal 100 to identify and communicate with the client terminal 200.

The client side management means 220 is means for managing host terminal information 102 of the host terminal 100 that accepts communication establishment. As this results in the client terminal 200 itself managing information related to the host terminal 100, the terminal information related to the host terminal 100 need not be managed on the server side and load on the server can be reduced.

The server 300 is a server machine that mediates establishment of communication between the host terminal 100 and the client terminal 200. Since the present embodiment is configured so that the host terminal information 102 and the client terminal information 202 are respectively managed by the client terminal 200 and the host terminal 100, the server 300, without itself managing such information, uses the client terminal information 202 received from the host terminal 100 as the basis for notifying the client terminal 200 requested to establish communication by the host terminal 100 that a communication establishment request occurred.

In the configuration according to the present embodiment, the client terminal 200 does not request the server to perform processing. Load on the server 300 can therefore be minimized.

The system for establishing communication 1 comprises connection means 400. The connection means 400 is means that, after the host terminal 100 makes, based on client terminal information 202 the host terminal 100 received from a client terminal 200 that sent a communication start request via the server 300, a direct session start request to the client terminal 200 concerned, performs processing for establishing communication between the host terminal 100 and the client terminal 200.

The server 300 performs only processing for sending to the client terminal 200 the host terminal 100 wants to connect to, the host terminal information 102 required for the connection, and in the present embodiment performs no management related to establishing communication or retaining data related to the host terminal 100 or client terminal 200.

In conventional communication establishment and communication, there are found many configurations that need a server and require the server to retain information necessary for establishing communication. However, since the system for establishing communication 1 according to the present invention is configured as set out in the foregoing, it frees the server from the need to manage communication and to retain various information required for communication, and as such, offers a configuration that avoids heavy traffic to the server and obviates the need for real-time server response. As regards information related to communication establishment, since the host terminal 100 and client terminal 200 that engage in communication are configured to retain such information locally, a system for establishing communication that is strong in server-failure resistance and offers high security can be achieved.

Communication with the client terminal 200 can be reestablished simply by having the host terminal 100 constantly monitor permissibility of establishing communication with the client terminal 200, and when information required for establishing communication with the client terminal 200 (IP address and the like) was changed, having the host terminal 100 send information required for reestablishing communication via the server 300. In other words, insofar as communication was once established, communication can be reestablished from the side of either the host terminal 100 or the client terminal 200 using already retained information required for establishing communication, thus making possible provision of a system for establishing communication that reduces load on the server and can maintain communication even during server outage or other failure.

Communication establishment processing by the connection means 400 will now be explained. The connection means 400 comprises the host side communication request means 110, the client side communication request means 210, and client terminal authentication means 410.

First, as shown in FIGS. 1 and 3, the host side communication request means 110 extracts the client terminal 200 that requested communication from the host side management means 120 and designates the same. The host side communication request means 110 then sends its own host terminal information 102 to the server 300. As this enables the server 300 to identify the client terminal 200 designated by the host side communication request means 110, the server 300, after having identified the client terminal 200 concerned, sends the host terminal information 102 to the client terminal 200 and notifies it to request communication establishment with the host terminal 100.

Next, based on the received host terminal information 102, the client side communication request means 210 of the client terminal 200 designated by the host terminal 100 extracts the host terminal 100 from the client side management means 220 and designates the same. It then sends its own client terminal information 202 to the designated host terminal 100 and requests communication establishment with the host terminal 100.

Following this, authentication processing is performed by the client terminal authentication means 410 used by the host terminal 100 to authenticate the client terminal 200, and communication is established.

Owing to the aforesaid configuration, server 300 intervention in communication establishment can be minimized, time to communication establishment can be shortened, and inter-terminal communication can be continued even during server outage. Moreover, even in a case where IP address or other host terminal information 102 used to establish host terminal 100 communication is changed, communication can be reestablished by the host terminal 100 sending the changed host terminal information 102 to the client terminal 200 via server 300, thereby enabling server load reduction. In addition, reestablishment of communication can be requested directly to host terminal 100 from client terminal 200 side without server 300 intervention.

In the present embodiment, the client terminal authentication means 410 is configured to perform authentication using a random key. Specifically, a configuration is adopted wherein the client terminal 200 encrypts a terminal unique ID based on a random key generated by the host terminal 100, sends it to the host terminal 100, and the host terminal 100 performs authentication by decrypting the encrypted terminal unique ID.

As an actual implementation of the present embodiment, the host terminal 100 upon receiving the request to establish communication sends an encrypted random key to the client terminal 200, the client terminal 200 upon receiving the encrypted random key encrypts the client terminal ID (device token) and sends it to the host terminal 100. Upon receiving the encrypted client terminal unique ID, the host terminal 100 decrypts it, compares it with client terminal unique IDs registered in advance, and if the client terminal unique ID is contained in the registered list, deems it an authentic ID and establishes communication.

This configuration ensures communication security and makes it possible to provide a highly reliable system for establishing communication.

As shown in FIG. 1, the host terminal 100 can be configured to comprise host side communication disconnect detection means 130. The host side communication disconnect detection means 130 is means for detection on the host terminal 100 side of disconnection of established communication. When the host side communication disconnect detection means 130 detects disconnection of communication, the host side communication request means 110 extracts the client terminal 200 requesting communication from the host side management means 120, designates the same, and sends host terminal information 102 to the server 300. This makes it possible to perform processing for reestablishing communication with the designated client terminal 200. Owing to this configuration, prompt detection of communication disconnection and transition to reconnection processing via the server 300 becomes possible.

Further, the client terminal 200 can be configured to comprise client side communication disconnect detection means 230. The client side communication disconnect detection means 230 is means for detection on the client terminal 200 side of disconnection of established communication. As indicated in FIG. 2, when the client side communication disconnect detection means 230 detects disconnection of communication, the client side communication request means 210 sends, based on the host terminal information 102, client terminal information 202 to the designated host terminal 100 extracted from the client side management means 220 and requests communication establishment with the host terminal 100. As a result, communication can be reestablished with the designated host terminal 100.

This configuration makes use of the server 300 that mediates establishment of communication and makes it possible to send a communication establishment request directly from the client terminal 200 to the host terminal 100 using the host terminal information 102 stored in advance, thereby reducing server load and shortening time to communication establishment.

In the present embodiment, the host terminal information 102 consists of the IP address and port number of the host terminal 100. Similarly, the client terminal information 202 consists of the IP address and port number of the client terminal 200. Thanks to this arrangement, each party to the communication is made able to directly identify the other. That said, the host terminal information 102 and the client terminal information 202 are not limited to this mode and adoption of another suitable arrangement is possible insofar as based on information enabling identification.

As set out in the foregoing, owing to the adoption of the aforesaid configuration of the system for establishing communication 1 according to the present invention, the server 300 that mediates establishment of communication comes into use only during communication establishment at the time when communication is established from the host terminal 100 to the client terminal 200, thereby enabling a configuration that, once communication is established, does not need the server 300 that mediates establishment of communication. Moreover, when communication is established from the client terminal 200 to the host terminal 100, the communication establishment is performed using host information stored in the client terminal 200 beforehand, thus realizing a configuration that does not rely on the server 300 that mediates establishment of communication.

Still further, as regards the host terminal information 102 stored in the client terminal 200, when the host terminal information 102 constantly monitored by the host terminal 100 changes, the host terminal information 102 in the client terminal 200 is promptly updated using the server 300 that mediates establishment of communication. The client terminal 200 can therefore always establish communication with the host terminal 100 without passing through the mediating server 300.

In a conventional system, the server 300 that mediates establishment of communication would probably experience heavy access traffic and trigger communication failure during a disaster or similar emergency. However, the system for establishing communication 1 according to the present invention does not always require the communication establishment mediating server 300 in order to establish communication. Access to the communication establishment mediating server 300 is therefore limited, and even when access to the communication establishment mediating server 300 is necessary, the access is distributed, so that load on the server 300 that mediates establishment of communication is low and likelihood of communication breakdown is minimal.

Namely, the configuration according to the present invention makes it possible to provide a system for establishing communication that can shorten time to establishment of communication between host terminal and client terminal, can reduce load on server during processing for establishing communication between host terminal and client terminal during inter-terminal communication after establishment of communication and during reconnection processing, and can maintain communication even during server outage or other failure.

Situations in which the system for establishing communication 1 according to the present invention might be utilized include the following:

(1) Incorporating the system for establishing communication 1 according to the present invention into a communication-capable shutter of, for example, a car garage or shop and, while away, or in the case of an unmanned garage/shop, dealing with a delivery person or delivery of merchandise through remote image (video) confirmation of sales slip etc. and two-way conversation, and then opening or closing the shutter.

(2) Incorporating the system for establishing communication 1 according to the present invention into a data logger installed at a farm field, collecting data and, as necessary, installing a camera and observing the field's condition.

(3) Incorporating the system for establishing communication 1 into a smart key for opening/closing a door of one's home/shop and, while away, or in the case of a vacant or unmanned home/shop, dealing with a delivery person or delivery of merchandise through remote image (video) confirmation of sales slip etc. and two-way conversation, and then opening or closing the door.

(4) Incorporating the system for establishing communication 1 according to the present invention into a surveillance camera and when an abnormality is detected by a motion sensor, human presence sensor or similar, surveilling from a client terminal, threatening by voice, or similar.

(5) Among other possibilities, applying the system for establishing communication 1 according to the present invention to a two-way communication system consisting of a smartphone connected to the Internet by a client terminal that conventionally required a server.

By way of example, the system for establishing communication 1 according to the present invention works as follows when applied to a communication-capable shutter of a car or other garage:

(1) Communication start button installed on garage is pushed.

(2) Notification to pre-registered client terminal (smartphone or similar) performing video call (communication) (PUSH notification or email) is requested, causing terminal information of host terminal (IP address, port number) to be sent to server as network connection information.

(3) Terminal information of host terminal (IP address, port number) notified (by PUSH notification or email) and sent to client terminal (smartphone or similar) designated by server.

(4) Client terminal, using data received by notification (PUSH notification or email), sends client terminal information (IP address, port number) to host terminal.

(5) Host terminal, using received client terminal information, calls client terminal, thereby establishing connection via network.

(6) Connection is completed and two-way communication (video call) commences.

A configuration is possible wherein, after connection, both global address and local address are constantly managed/checked and connection route is automatically changed when network connection environment (global connection or local connection) changes.

A configuration is also possible wherein, after connection, the connection is constantly monitored and when communication is cut off for some reason, host terminal automatically reconnects by executing the transition procedure of (2) above.

Moreover, a configuration is also possible wherein, in a case where host terminal is a previously connected to client terminal, an attempt is made to connect directly based on client terminal information (IP address, port number) stored in host terminal, and when connection fails, connection is attempted by sending client terminal information required for connection using PUSH notification or email sending.

EXPLANATION OF SYMBOLS

1 System for establishing communication
100 Host terminal
102 Host terminal information
110 Host side communication request means
120 Host side management means
130 Host side communication disconnect detection means
140 Video display means
150 Imaging means
160 Microphone
170 Speaker
180 Communication initiation means
200 Client terminal
202 Client terminal information
210 Client side communication request means
220 Client side management means
230 Client side communication disconnect detection means
240 Video display means
250 Imaging means
260 Microphone
270 Speaker
300 Server
400 Connection means
410 Client terminal authentication means

The invention claimed is:

1. A system to establish two-way communication via the Internet, comprising:
a host terminal configured to send a communication start request;
at least one client terminal configured to accept the communication start request;
a server configured to mediate an establishment of two-way communication between the host terminal and said at least one client terminal;
wherein the host terminal comprises a host-side communication requester configured to send host terminal information to the server and a host-side manager configured to manage client terminal information of individual client terminals, each client terminal comprising a client-side communication requester configured to send client terminal information to the host terminal and a client-side manager to manage the host terminal information;
a connector, after the host terminal makes a direct session start request to said at least one client terminal based on the client terminal information received from said at least one client terminal, to establish the two-way communication between the host terminal and said at least one client terminal;
wherein, in order to enable the connector to shorten a time to a communication establishment and to reduce load on the server at a time of a change in the host terminal information used to establish communication with the host terminal, by the host terminal sending a changed host terminal information to the client terminal via the server:
the host-side communication requester extracts, from the changed host terminal information, a client terminal requesting communication from the client-side manager, designates the client terminal as a designated client terminal, and sends the changed host terminal information to the server;
the server, after identifying the designated client terminal, sends the changed host terminal information to the designated client terminal and notifies the designated client terminal to request the communication establishment with the host terminal;
the client-side communication requester being configured to, based on a received host terminal information, send the client terminal information to a designated host terminal extracted from the client-side manager and request the designated host terminal to establish a communication with the designated client terminal; and
wherein the connector further comprises a client terminal authenticator for use by the host terminal to authenticate the client terminal.

2. The system of claim 1, wherein the client terminal authenticator is configured to perform authentication by the client terminal using a random key generated by the host terminal to encrypt a terminal unique ID and send an encrypted terminal unique ID to the host terminal; and wherein the host terminal is configured to decrypt the encrypted terminal unique ID.

3. The system of claim 1, wherein the host terminal information includes an IP address and a port number of the host terminal; and wherein the client terminal information includes an IP address and a port number of a corresponding client terminal.

4. A system to establish two-way communication via the Internet, comprising:
a host terminal configured to send a communication start request;
at least one client terminal configured to accept the communication start request;
a server configured to mediate an establishment of two-way communication between the host terminal and said at least one client terminal;
wherein the host terminal comprises a host-side communication requester configured to send host terminal information to the server and a host-side manager configured to manage client terminal information of individual client terminals, each client terminal comprising a client-side communication requester configured to send client terminal information to the host terminal and a client-side manager to manage the host terminal information;
a connector, after the host terminal makes a direct session start request to said at least one client terminal based on the client terminal information received from said at least one client terminal, to establish the two-way communication between the host terminal and said at least one client terminal; and
wherein the host terminal comprises a host-side communication disconnect detector and the host-side communication requester responds to detection of a communication disconnection by the host-side communication disconnect detector by extracting a client terminal requesting a communication establishment from the client-side manager, designating the client terminal as a designated client terminal, and sending host terminal information to the server, thereby reestablishing communication with the designated client terminal.

5. The system of claim 4, wherein the host terminal information includes an IP address and a port number of the host terminal; and wherein the client terminal information includes an IP address and a port number of a corresponding client terminal.

6. A system to establish two-way communication via the Internet, comprising:
a host terminal configured to send a communication start request;
at least one client terminal configured to accept the communication start request;
a server configured to mediate an establishment of two-way communication between the host terminal and said at least one client terminal;
wherein the host terminal comprises a host-side communication requester configured to send host terminal information to the server and a host-side manager configured to manage client terminal information of individual client terminals, each client terminal comprising a client-side communication requester configured to send client terminal information to the host terminal and a client-side manager to manage the host terminal information;
a connector, after the host terminal makes a direct session start request to said at least one client terminal based on the client terminal information received from said at least one client terminal, to establish the two-way communication between the host terminal and said at least one client terminal; and
wherein said each client terminal comprises a client-side communication disconnect detector, and the client-side communication requester responds to detection of a communication disconnection by the client-side communication disconnect detector by sending, based on the host terminal information, the client terminal information to a designated host terminal extracted from the client-side manager and requesting the designated host terminal to establish communication, thereby reestablishing communication with the designated host terminal.

7. The system of claim 6, wherein the host terminal information includes an IP address and a port number of the host terminal; and wherein the client terminal information includes an IP address and a port number of a corresponding client terminal.

* * * * *